(12) United States Patent
Harter et al.

(10) Patent No.: US 9,435,386 B2
(45) Date of Patent: Sep. 6, 2016

(54) FLUID FRICTION CLUTCH

(75) Inventors: Michael Harter, Commerce Township, MI (US); David McDermott, Commerce Township, MI (US)

(73) Assignee: MAHLE International GmbH, Stuttgart (DE)

( * ) Notice: Subject to any disclaimer, the term of this patent is extended or adjusted under 35 U.S.C. 154(b) by 1041 days.

(21) Appl. No.: 12/566,363

(22) Filed: Sep. 24, 2009

(65) Prior Publication Data

US 2011/0067970 A1    Mar. 24, 2011

(51) Int. Cl.
F16D 35/02    (2006.01)

(52) U.S. Cl.
CPC .................................. *F16D 35/024* (2013.01)

(58) Field of Classification Search
CPC ...................................................... F16D 35/024
USPC ................................. 192/58.5–58.8
See application file for complete search history.

(56) References Cited

U.S. PATENT DOCUMENTS

| 4,405,039 | A | | 9/1983 | Hauser | |
|---|---|---|---|---|---|
| 4,932,509 | A | * | 6/1990 | Binder | 192/58.41 |
| 4,982,808 | A | * | 1/1991 | Taureg et al. | 192/58.41 |
| 5,575,368 | A | | 11/1996 | Kikuchi et al. | |
| 5,722,523 | A | | 3/1998 | Martin | |
| 6,026,943 | A | * | 2/2000 | Fuchs et al. | 192/58.61 |
| 6,032,775 | A | * | 3/2000 | Martin | 192/58.61 |
| 6,752,251 | B2 | * | 6/2004 | May et al. | 192/58.61 |
| 7,588,132 | B2 | * | 9/2009 | Shiozaki et al. | 192/58.61 |

FOREIGN PATENT DOCUMENTS

| DE | 30 29 992 C2 | 3/1982 |
|---|---|---|
| DE | 44 09 648 C1 | 10/1995 |
| DE | 195 09 978 C2 | 11/1996 |
| FR | 2 351 316 | 12/1977 |
| GB | 849933 | 9/1960 |

* cited by examiner

*Primary Examiner* — Jacob S Scott
(74) *Attorney, Agent, or Firm* — Muncy, Geissler, Olds & Lowe, P.C.

(57) ABSTRACT

A fluid friction clutch includes a drivable housing having a working chamber and a reservoir, at least one opening between the reservoir and the working chamber configured to provide fluid communication between the reservoir and the working chamber, a driven disk supported for rotation in the working chamber, and a rotor mounted in the reservoir and rotatably coupled to the driven disk for rotation about an axis of rotation, the rotor having a plurality of arms, separated by a plurality of gaps, projecting away from its axis of rotation.

12 Claims, 4 Drawing Sheets

FLUID FRICTION CLUTCH

BACKGROUND OF THE INVENTION

1. Field of the Invention

The present invention is directed to a fluid friction clutch having a working chamber, a reservoir and a rotor in the reservoir and toward a method of distributing fluid in the reservoir, and, more specifically, toward a fluid friction clutch having a working chamber, a reservoir and a rotor in the reservoir, the rotor having a plurality of arms separated by gaps for distributing fluid in the reservoir and toward a method of distributing fluid in the reservoir using the rotor.

2. Description of the Background Art

Conventional fluid friction clutches include a housing having a working chamber, a reservoir and a valve for controlling the movement of a working fluid between the reservoir and the working chamber. A driven disk is mounted for rotation in the working chamber, and a degree of coupling between the driven disk and the housing is determined by the amount of working fluid in the working chamber. When substantially all the working fluid is in the reservoir, the clutch is disengaged, and the housing of the clutch is coupled to the driven disk only via bearing friction between the clutch housing and a drive shaft and friction produced by air located in the working chamber between the clutch housing and the driven disk. Releasing working fluid into the working chamber couples the motion of the driven disk to the housing. The rotation of the driven disc helps to transfer fluid from the reservoir to the working chamber, and if additional fluid from the reservoir is not provided to the working chamber, the coupling between the driven disk and the housing decreases. Such clutches may be used, for example, for driving a fan in a liquid-cooled internal combustion engine to help control the temperature of a circulating cooling medium.

When the temperature of the cooling medium is low, the working fluid is retained in the reservoir and there is little coupling between the driven disk and the housing. As the temperature of the cooling medium increases, an opening between the reservoir and the working chamber is uncovered. The rotation of the housing produced by the limited coupling between the driven disk and the housing draws fluid in the reservoir toward the opening and into the working chamber. The presence of the liquid in the working chamber increases the coupling between the driven disk and the housing and increases the rotational speed of the housing and this drives fluid from the reservoir into the working chamber at a greater rate, further increasing the coupling between the driven disk and the housing.

It will thus be appreciated that when the housing is rotating slowly, fluid is slow to move from the reservoir to the working chamber. When the housing is connected to a fan, this can delay fan actuation and possibly lead to an overheating of the engine or component cooled by the fan.

One conventional method of speeding the movement of working fluid from the reservoir to the working chamber is to provide a supplemental disk in the reservoir that is driven by the shaft that drives the driven disk. This concept is disclosed in U.S. Pat. No. 4,405,039 to Hauser which is incorporated herein by reference. The supplemental disk is mounted in close proximity to a wall of the housing in the reservoir to increase coupling between the drive shaft and the housing even when little or no working fluid is present in the working chamber. The rotation of the supplemental disk in the reservoir and the close spacing of the supplemental disk and a wall of the housing entrains the fluid to draw it toward the opening, and also tends to heat the fluid in the reservoir thus decreasing its viscosity and promoting more rapid flow. This approach provides benefits, especially at startup. However, the continual shearing of the fluid between the supplemental disk and the housing speeds the degradation of the fluid and also increases the load on the engine driving the driven disk. It would therefore be desirable to provide a fluid friction clutch that enhances fluid movement from a clutch reservoir to a clutch working chamber, especially at low speeds, which clutch produces less sheering of the fluid in the reservoir and less drag on the motor driving a driven disk of the clutch.

SUMMARY OF THE INVENTION

These and other problems are addressed by embodiments of the present invention, a first aspect of which comprises a fluid friction clutch that includes a drivable housing having a working chamber and a reservoir. At least one opening is provided between the reservoir and the working chamber which provides fluid communication between the reservoir and the working chamber, and a driven disk is supported for rotation in the working chamber. A rotor is mounted in the reservoir and is coupled to the driven disk for rotation about an axis of rotation, and the rotor has a plurality of arms, separated by a plurality of gaps, projecting away from the axis of rotation.

Another aspect of the invention comprises a method of effecting fluid transfer from a reservoir to a working chamber of a fluid friction clutch. The method includes partially filling the reservoir with a working fluid, mounting a rotor in the reservoir for rotation about an axis of rotation, coupling the rotor to a driven disk mounted in the working chamber, and driving the rotor in the reservoir to distribute the working fluid around the reservoir and toward the at least one opening. The rotor has a plurality of arms, separated by a plurality of gaps, projecting away from the axis of rotation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
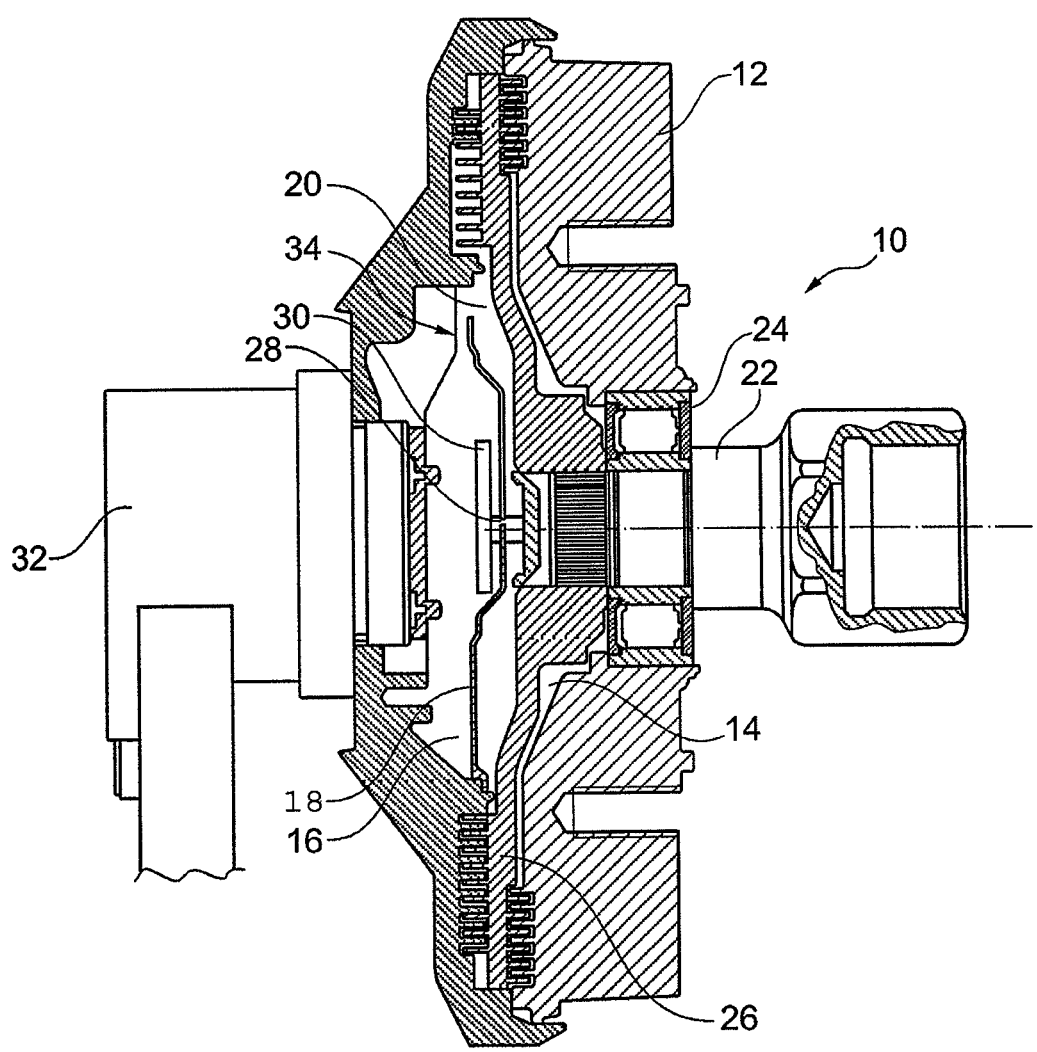
FIG. 1 is a sectional side elevational view of a fluid friction clutch according to an embodiment of the present invention, which clutch includes a rotor in a working fluid reservoir.

FIG. 1 illustrates a fluid friction clutch 10 according to an embodiment of the present invention. The clutch 10 includes a housing 12 that includes a working chamber 14 and a reservoir 16 separated by a wall 18 having at least one opening 20 for providing fluid communicating between the reservoir 16 and the working chamber 14. The housing 12 is mounted on a drive shaft 22 via bearings 24, and a driven disk 26 in working chamber 14 is connected to the drive shaft 22 and rotates when drive shaft 22 rotates. A cooling fan (not illustrated) may be mounted on housing 12, and the clutch 10 determines the speed of the housing 12 relative to the drive shaft 22 and thus the speed of the cooling fan. A rotor shaft 28 extends through the wall 18 and supports a rotor 30 in reservoir 16 for rotation with the drive shaft 22 and the driven disk 26. A solenoid 32 controls the position of a valve lever 34 relative to opening 20 and selectively moves the valve lever 34 between open and closed positions relative to The amount of working fluid in working chamber 14 affects the degree of coupling between the driven disk 26 and the housing 12. When the working chamber 14 is substantially empty of working fluid, the drive shaft is only coupled to the housing via bearings 24 and an air interface between driven disk 26 and the walls of the working housing. Rotor 30 is spaced sufficiently far from wall 18 such that there is little if any coupling between the rotor 30 and the wall 18 via the working fluid in the reservoir. Housing 12 rotates slowly when the working chamber 14 is empty. When working fluid is released into working chamber 14 by valve lever 34 uncovering opening 20, the fluid couples the driven disk 26 to the housing 12, and the rotation of the housing 12 increases. The increased rotation of housing 12 helps to distribute the working fluid in the reservoir 16 in a ring and maintain a flow of fluid toward opening 20. As the driven disk rotates, the working fluid returns to the reservoir 16 via return passages, and additional working fluid must be released from reservoir 16 to maintain the coupling between the driven disk 26 and the housing. The working fluid circulates between the working chamber 14 and the reservoir 16 in this manner until valve lever 34 is closed.

Under certain conditions, upon a cold start of an engine, for example, the low degree of coupling between the driven disk 26 and the housing 12 does not distribute the working fluid evenly throughout the reservoir, and the movement of working fluid from reservoir 16 to working chamber 14 may be slower than optimal when valve lever 34 is moved to uncover opening 20. In the disclosed embodiment the distribution of the working fluid in the reservoir 16 is improved by rotor 30 which creates a circular flow of air in the reservoir as it spins, and this rotation of the rotor entrains the working fluid and distributes it in a ring in the reservoir 16, thus placing some of the fluid near opening 20 to provide enhanced flow of the fluid into the working chamber when the valve 34 opens. The rotor 30 is spaced from wall 18 of reservoir 16 sufficiently so that the rotation of the rotor 30 is not (or is only slightly) coupled to the housing 12. Thus the spinning of the rotor 30 in the reservoir 16 does not significantly shear the working fluid and does not contribute to the degradation of the working fluid.

Figure 2:
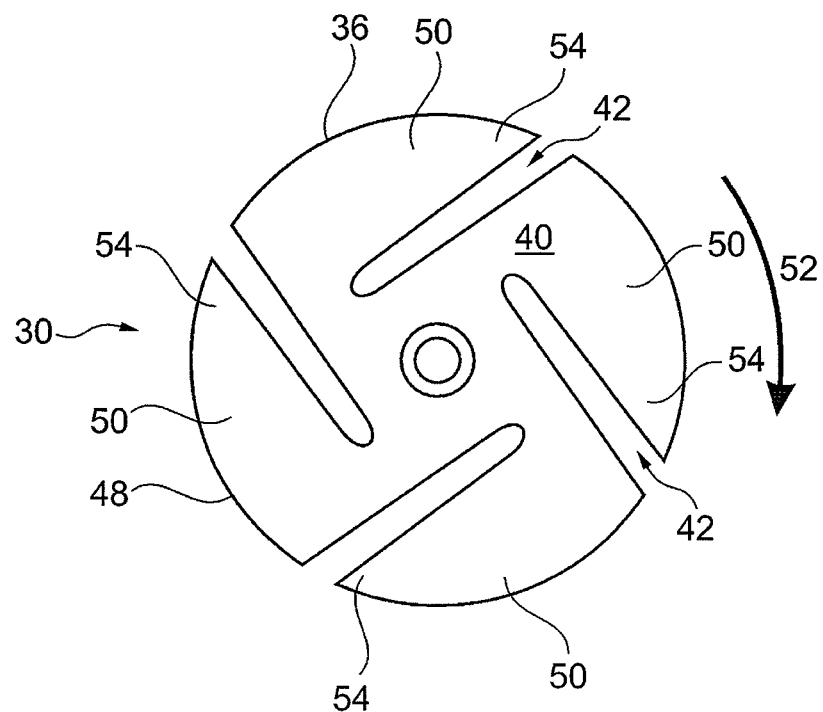
FIG. 2 is a plan view of a first embodiment of the rotor of FIG. 1.

Rotor 30 is illustrated in FIG. 2 and is formed from a disk 36 having an outer periphery 48 and generally parallel sides 40. Substantially linear slots 42 are cut or formed in disk 36 and extend along non-radial chords of disk 36 to periphery 48 and define a plurality of arms 50 spaced apart by slots 42. Rotor 30 is intended to be mounted so that it will rotate in the direction of arrow 52, clockwise in FIG. 2, with the acutely angled ends 54 of arms 50 moving in the direction of arrow 52. While four slots 42 defining four arms 50 are illustrated in FIG. 2, rotor 30 could include greater or smaller number of slots 42. These slots help promote a circular flow of air in reservoir 16 as rotor 30 rotates, and the rotation of rotor 30 entrains the working fluid and draws it into a ring in the interior of the reservoir 16. The length of slots 42 is selected to be long enough to allow for the passage of air from one side of the disk to the other even when the rotor 30 is wetted during operation and creates a partial hydraulic seal between rotor 30 and wall 18. Distributing the working fluid in a ring in this manner allows for the fluid to enter working chamber 14 in a timely manner when valve lever 34 uncovers opening 20.

Figure 3:
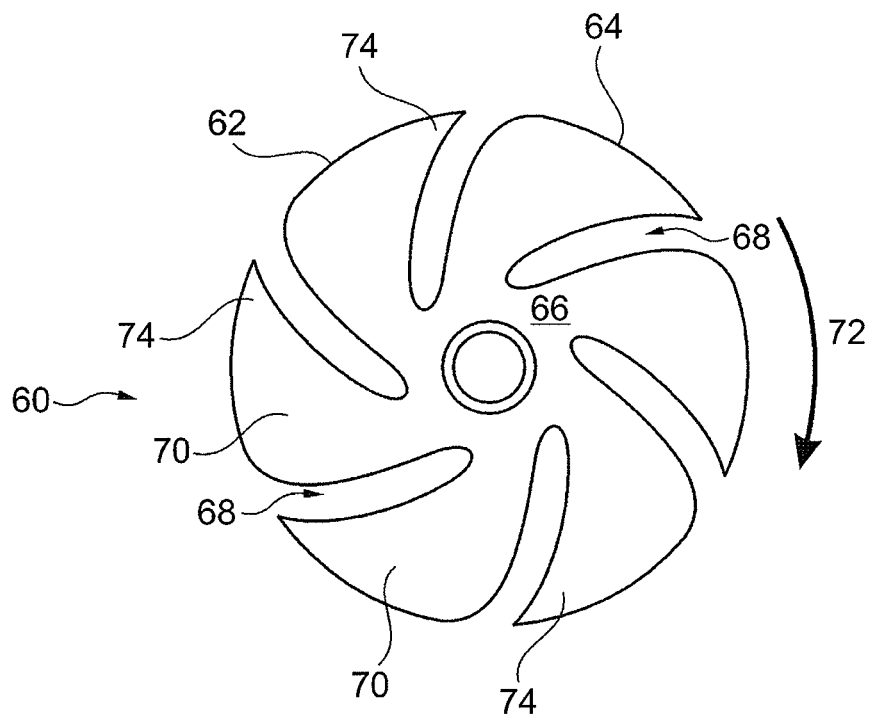
FIG. 3 is a plan view of a second embodiment of the rotor of FIG. 1.

A second embodiment of a rotor 60 usable in the fluid friction clutch 10 is illustrated in FIG. 3. Rotor 60 comprises a disk 62 having an outer periphery 64 and generally parallel sides 66. Arcuate slots 68 are cut or formed in disk 62 which slots 68 extend to periphery 64 of disk 62 and define a plurality of arms 70. Rotor 60 is intended to be mounted for rotation in the direction of arrow 72, clockwise in FIG. 3, so that the acutely angled ends 74 of arms 70 move forward in the rotation direction 72. The arcuate arms will establish a circular flow of fluid in reservoir 16 when the rotor 60 rotates which will entrain the working fluid and form a ring of fluid inside the reservoir 16. As in the previous embodiment, the lengths of slots 68 are selected to be long enough to allow for the passage of air from one side of the disk 62 to the other even when the rotor 60 rotates and forms a partial hydraulic seal with wall 18.

Figure 4:
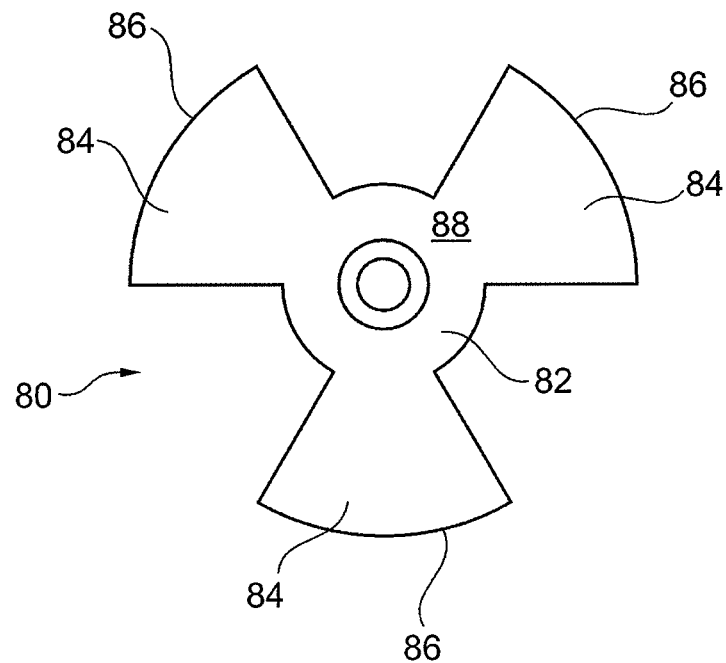
FIG. 4 is a plan view of a third embodiment of the rotor of FIG. 1.

A third embodiment of a rotor usable in fluid friction clutch 10 is illustrated in FIG. 4. Rotor 80 comprises a central body portion 82 from which a plurality of arms 84 project. The outer edges 86 of arms 84 are arcuate and lie along arcs of a single circle, and the circumferential width of the arms increases in a direction away from the rotor's axis of rotation. The sides 88 of rotor 80, including arms 84 are generally planar. The rotation of rotor 80, as in the previous embodiments, generates a circular flow of fluid in the reservoir 16, and forms a ring of working fluid inside reservoir 16.

Figure 5:
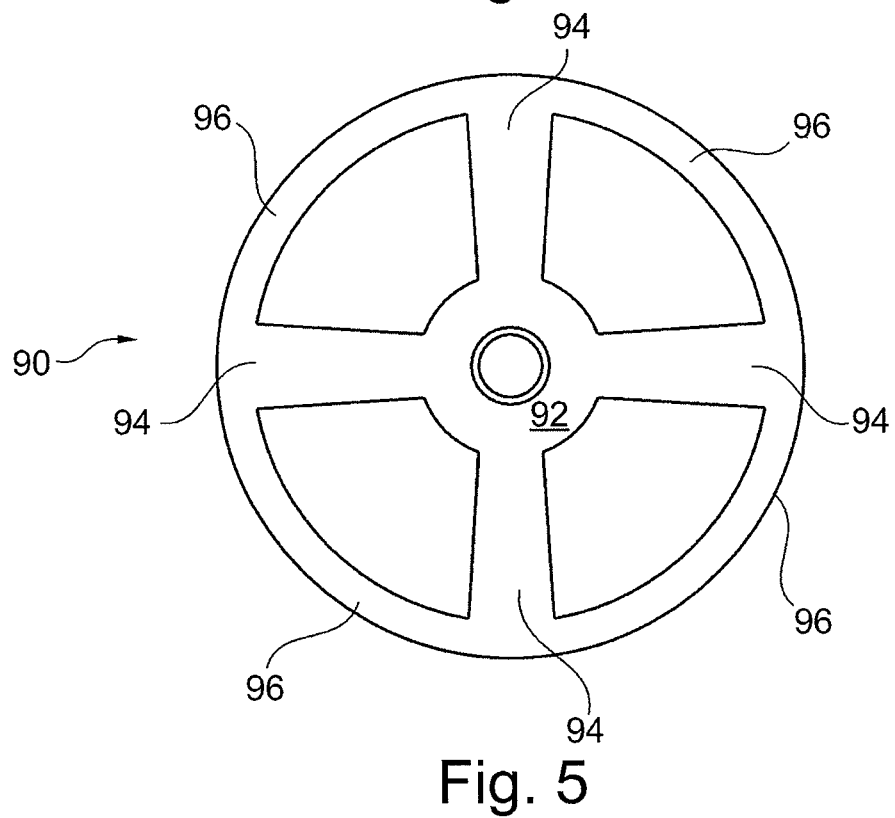
FIG. 5 is a plan view of a fourth embodiment of the rotor of FIG. 1.

A fourth embodiment of a rotor usable in fluid friction clutch 10 is illustrated in FIG. 5. Rotor 90 includes a central body portion 92 from which a plurality of arms 94 extend. The arms 94 are connected by arcuate segments 96 which together form an outer peripheral ring of rotor 90. The rotation of rotor 90, like the previous embodiments, generates a circular flow of fluid inside reservoir 16 as it entrains the working fluid in the reservoir 16 and forms a ring of working fluid inside reservoir 16.

Figure 6:
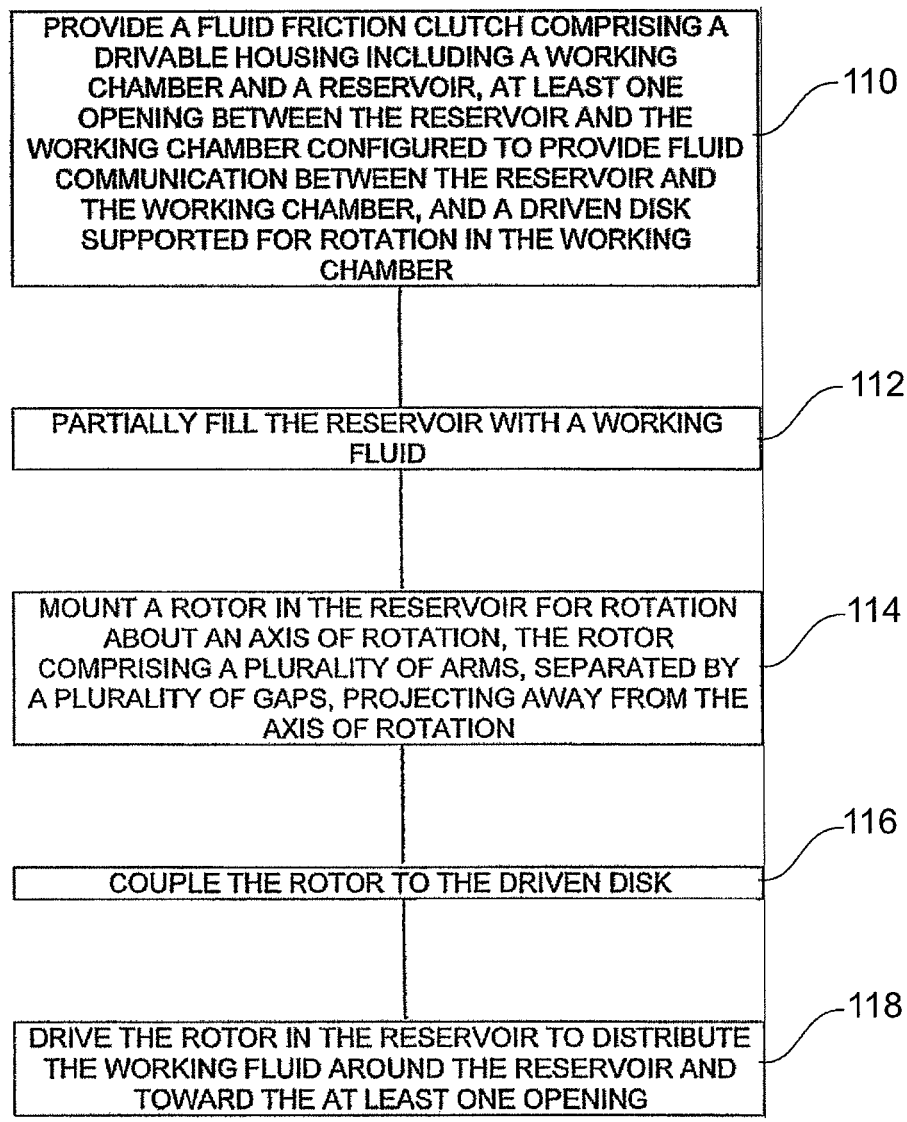
FIG. 6 is a flow chart illustrating a method according to an embodiment of the present invention.

A method according to an embodiment of the invention is illustrated in FIG. 6. The method includes a block 110 of providing a fluid friction clutch comprising a drivable housing including a working chamber and a reservoir, at least one opening between the reservoir and the working chamber configured to provide fluid communication between the reservoir and the working chamber, and a driven disk supported for rotation in the working chamber. The method involves effecting fluid transfer from the reservoir to the working chamber and includes a block 112 of partially filling the reservoir with a working fluid, a block 114 of mounting a rotor in the reservoir for rotation about an axis of rotation, the rotor comprising a plurality of arms, separated by a plurality of gaps, projecting away from the axis of rotation, and a block 116 of coupling the rotor to the driven disk. The method also includes a block 118 of driving the rotor in the reservoir to distribute the working fluid around the reservoir and toward the at least one opening.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A fluid friction clutch comprising:
    a drivable housing including a working chamber and a reservoir;
    at least one opening between the reservoir and the working chamber configured to provide fluid communication between the reservoir and the working chamber;
    a driven disk supported for rotation in the working chamber; and
    a rotor mounted in the reservoir, coupled to the driven disk for rotation about an axis of rotation, the rotor having a peripheral edge,
    wherein said rotor comprises a plurality of arms, separated by a plurality of gaps having open ends at the peripheral edge, projecting away from the axis of rotation, and
    wherein said rotor is mounted in said reservoir such that fluid coupling between said rotor and said housing is avoided.

2. The fluid friction clutch of claim 1, wherein each of said plurality of arms has a first side lying in a first plane and a second side lying in a second plane parallel to said first plane.

3. The fluid friction clutch of claim 1, wherein said gaps comprise a plurality of slots extending into the disk through the peripheral edge.

4. The fluid friction clutch of claim 3 wherein said slots are linear.

5. The fluid friction clutch of claim 4, wherein said slots are aligned with a non-radial chord of the disk.

6. The fluid friction clutch of claim 3, wherein said slots are curved in a length direction of the slots.

7. The fluid friction clutch of claim 1, wherein said rotor comprises a central body and wherein said plurality of arms project from said central body.

8. The fluid friction clutch of claim 1, wherein said plurality of arms have a circumferential dimension that increases in a direction away from the axis of rotation.

9. The fluid friction clutch of claim 1, wherein said rotor including said plurality of arms is substantially planar.

10. A fluid friction clutch comprising:
    a drivable housing including a working chamber and a reservoir;
    at least one opening between the reservoir and the working chamber configured to provide fluid communication between the reservoir and the working chamber;
    a driven disk supported for rotation in the working chamber; and
    a rotor mounted in the reservoir, coupled to the driven disk for rotation about an axis of rotation,
    wherein said rotor comprises a plurality of arms, separated by a plurality of gaps, projecting away from the axis of rotation,
    wherein said rotor including said plurality of arms is substantially planar, and
    wherein said plurality of arms include distal ends and wherein said distal ends are connected by arcuate segments.

11. In a fluid friction clutch comprising a drivable housing including a working chamber and a reservoir, at least one opening between the reservoir and the working chamber configured to provide fluid communication between the reservoir and the working chamber, and a driven disk supported for rotation in the working chamber, a method of effecting fluid transfer from the reservoir to the working chamber comprising:
    partially filling the reservoir with a working fluid;
    mounting a rotor in the reservoir for rotation about an axis of rotation;
    coupling the rotor to the driven disk; and
    driving the rotor in the reservoir to distribute the working fluid around the reservoir and toward the at least one opening,
    wherein the rotor comprises a plurality of arms and a peripheral edge and wherein the plurality of arms are, separated by a plurality of gaps that end at openings in the peripheral edge of the rotor, the arms projecting away from the axis of rotation, and
    wherein mounting the rotor in the reservoir comprises mounting the rotor in the reservoir such that fluid coupling between the rotor and the housing is avoided.

12. The method of claim 11, wherein the rotor is substantially planar.

* * * * *